BEST AVAILABLE COPY
ISAAC A. SERGEANT'S IMPROVED CLOTHES WRINGER.
Fig. 1,
Reissue No 2829
Div. 2.
2829
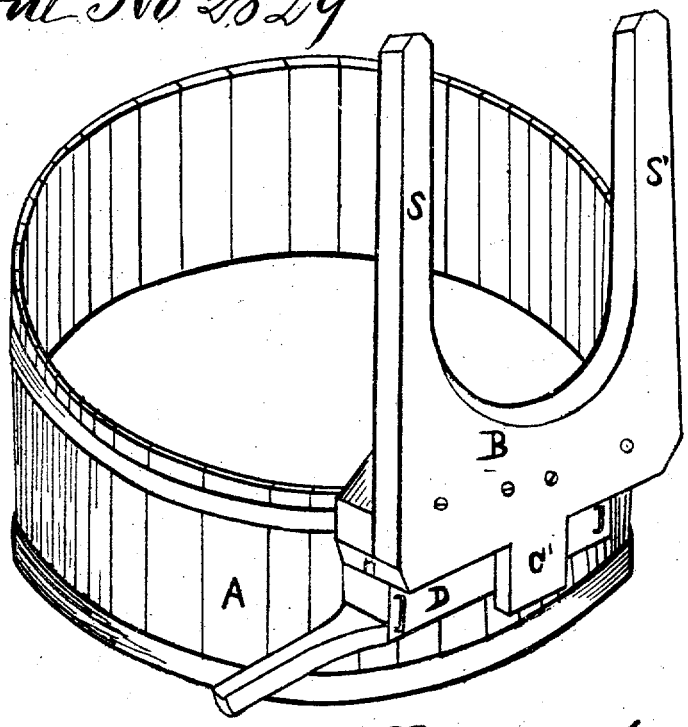
Reissued
Dec 311868
Fig. 2,
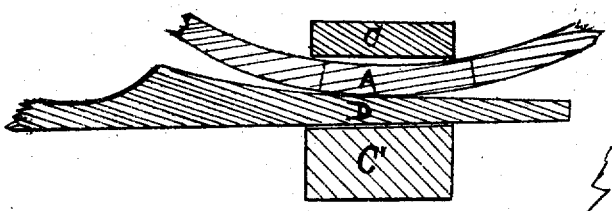
Fig. 3,
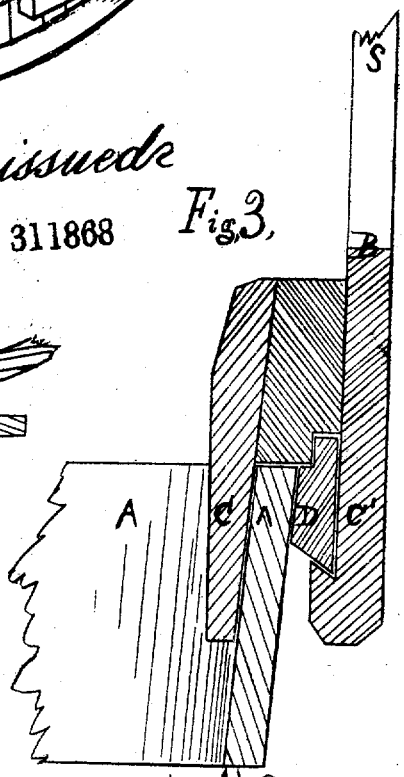
Witnesses.
E. J. Perry
H. Mason
Inventor. A. I. Sergeant
by Sylvanus Walker
Atty.

United States Patent Office.

ANN JANE SERGEANT, OF DAYTON, OHIO, ADMINISTRATRIX OF THE ESTATE OF ISAAC A. SERGEANT, DECEASED, ASSIGNOR TO SYLVENUS WALKER, OF NEWARK, NEW JERSEY.

*Letters Patent No.* 21,029, *dated July* 27, 1858; *reissue No.* 2,829, *dated December* 31, 1867.

IMPROVED CLOTHES-WRINGER.

The Schedule referred to in these Letters Patent and making part of the same.

TO ALL WHOM IT MAY CONCERN:

Be it known that ISAAC A. SERGEANT, of Springfield, in the county of Clark, and State of Ohio, invented certain new and useful Improvements in Clothes-Wringers; and I hereby declare the following to be a full, clear, and exact description of the same, reference being had to the accompanying drawings, which form part of this specification, in which the marks of reference correspond in all the figures.

Figure 1 is a front perspective view of the frame for supporting the wringing-mechanism of the machine, as attached to one side of a common wash-tub by means of a clamping-device.

Figure 2 is a horizontal section through the clamping-device, by which the frame of the machine is attached to one side of a wash-tub.

Figure 3 is a vertical section through the same device.

The first part of this invention consists of a portable machine, which may be temporarily attached to one side of a common wash-tub, or readily disconnected therefrom, whenever desired, and is specially adapted to wringing clothes.

The second part of this invention consists in a portable frame, and employed for supporting the wringing-mechanism of the machine upon one side of a common wash-tub, by means of a clamping-device, which is made to gripe one side of a wash-tub, for the purpose of attaching and sustaining temporarily the entire wringing-mechanism of the machine upon one side of a common wash-tub, in a firm and expeditious manner, regardless of the diameter of the tub, which greatly accelerates the operations of washing, rinsing, and wringing of clothes, as will be hereinafter more fully set forth and described.

To enable others to understand, construct, and use the invention, a description of one of the methods in which it may be carried out is hereafter more fully given.

In the drawings annexed, A represents a common wash-tub. B is a yoke, whose inner margin is of U-form, the sides of which extend upwards, forming uprights S S′. From the lower end of yoke B extend two jaws, C C′, the latter of which contains, within a dove-tail groove, a wedge or key, D, whose exposed side is made slightly concave, as shown in fig. 2. The office of the above-described jaws and wedge is to hold the frame, composed of the yoke B with uprights S S′ for supporting the wringing-mechanism of the machine, in position for use, on one side of a common wash-tub, in a permanent manner, temporarily, regardless of the diameter of the tub or the thickness of its rim, in reference to which service they are termed collectively the "vise."

This arrangement affords great facility for successively washing, rinsing, and wringing out the clothes from several waters in as many tubs, the wringer being readily changed from tub to tub.

Omitting to describe the general features of the wringing-mechanism of the machine, which will form the subject of another application for Letters Patent, of even date with this, and then more particularly the frame for supporting the wringing-mechanism in position, and the clamping-device by which the frame for holding the wringing-mechanism is attached to one side of a common wash-tub, which forms the subject of the present invention.

When it is desired to have free access to the tub, the wringer may be instantly removed therefrom, so as to allow the operations of washing, rinsing, and wringing to succeed each other, without trouble or delay, or the wringer may be detached instantly, for the purpose of cleaning its parts where dirt is apt to lodge—a common necessity to avoid soiling the next batch after dealing with much-soiled or colored garments.

It will be particularly observed that this wringing-machine differs very materially from those heretofore constructed, in its attachment, by a clamping-device, to one side only of a common wash-tub, so it can be constructed separate from and independent of the wash-tub, to which it may be clamped, whenever desired, regardless of its size or diameter; and a further distinctive feature consists in the manner of operation. The wringer being placed in position on one side of the tub, and the jaws made to gripe the same firmly, the clothes are admitted to the wringing-mechanism of the machine, and pass through it as fast as the water is expelled therefrom, and they are received at the opposite side of the machine into a basket, piece by piece, as they are wrung out. By this means articles that are of lighter fabric, as lace-curtains, can be operated upon lightly, as those that are heavy require more force. By this means lace-curtains may be wrung without injury, as the force required to expel the water, when all are wrung together in a bag, will tear the lighter fabrics before the water is sufficiently expelled from those that are stout and heavy.

I am thus enabled to construct a wringing-machine as a separate and independent device from the wash-tub, box, or other receptacle for receiving the water when expelled from the clothes.

Wringers heretofore constructed have been attached to the opposite sides of the box or vessel, consequently could not be readily attached to common wash-tubs of various diameters, therefore the box must be of a diameter to correspond to that for which the wringer is adapted, and would thus constitute a part of the device or wringing-machine. Thus, by means of the portable frame for holding the wringing-mechanism adapted to clamp the edge of one side only of a common wash-tub, I am enabled to overcome the serious objections referred to above.

In the clamping-device of the invention, a wedge or set-screw, cam, or spring, when having a bearing, so that when power is applied to them they, in conjunction with the jaws, gripe the edge of the tub as a "vise," may be used, in the manner and for the purposes set forth.

Having thus described the invention, what is claimed as new, and desired to be secured by Letters Patent, is—

1. The employment or use of a portable frame or yoke, B, with uprights S S′, or their equivalents, for supporting a clothes-wringing mechanism in position on one side of a common wash-tub, for the purposes set forth.

2. The application of an adjustable clamping-device, when employed to attach a clothes-wringer to one side only of a wash-tub, substantially in the manner described and for the purposes set forth.

ANN JANE SERGEANT.

Witnesses:

ARTHUR E. UNDERWOOD,
THOS. D. MITCHELL.